US012627096B2

(12) United States Patent
Liu et al.

(10) Patent No.: US 12,627,096 B2
(45) **Date of Patent: *May 12, 2026**

(54) PUSH-PULL COAXIAL CONNECTOR HAVING A MOVABLE SLEEVE

(71) Applicant: Outdoor Wireless Networks LLC, Claremont, NC (US)

(72) Inventors: Jin Liu, Suzhou (CN); Hongjuan An, Suzhou (CN); Jien Zheng, Suzhou (CN); Yujun Zhang, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 342 days.

This patent is subject to a terminal disclaimer.

(21) Appl. No.: 18/366,857

(22) Filed: Aug. 8, 2023

(65) Prior Publication Data

US 2024/0145987 A1 May 2, 2024

Related U.S. Application Data

(63) Continuation of application No. 17/466,021, filed on Sep. 3, 2021, now Pat. No. 11,721,937.

(30) Foreign Application Priority Data

Sep. 23, 2020 (CN) ......................... 202022099357.3

(51) Int. Cl.
*H01R 13/62* (2006.01)
*H01R 24/40* (2011.01)
*H01R 103/00* (2006.01)

(52) U.S. Cl.
CPC ............. *H01R 13/62* (2013.01); *H01R 24/40* (2013.01); *H01R 2103/00* (2013.01)

(58) Field of Classification Search
CPC ............................ H01R 13/625; H01R 13/635
See application file for complete search history.

(56) References Cited

U.S. PATENT DOCUMENTS 6,557,900 B1 * 5/2003 Austin .................. F16L 19/005 439/321
6,619,876 B2 9/2003 Vaitkus et al.
(Continued)

FOREIGN PATENT DOCUMENTS

KR 20200001612 U 7/2020

OTHER PUBLICATIONS

"International Search Report and Written Opinion corresponding to International Application No. PCT/2021/048841 mailed Dec. 28, 2021".

*Primary Examiner* — Oscar C Jimenez
(74) *Attorney, Agent, or Firm* — Myers Bigel, P.A.

(57) ABSTRACT

The present disclosure relates to a push-pull coaxial connector comprising: an external conductor, where the external conductor is configured to internally receive the matching external conductor of a mating connector, with concave parts or through holes on the inner surface of the side wall of the external conductor that house retainers and corresponding matching concave parts on the outer surface of the side wall of the mating external conductor, of which, there are one or more protrusions on the outer surface of the side wall of the external conductor; a sleeve surrounding the external conductor, where the sleeve is able to slide between the front position and rear position along the external conductor and is able to rotate around the circumference of the external conductor, of which, there are one or more corresponding notches to receive one or more protrusions on the rear surface of the sleeve; wherein, when the sleeve is at the front position, one or more protrusions are staggered away from one or more notches and abutted on the rear surface of the sleeve to prevent the sleeve from moving backward, and at this point, part of the retainer is in the concave part or through hole of the external conductor and part of it is in the mating concave part of the mating external (Continued)

conductor, thus maintaining the connection between the coaxial connector and mating connector; wherein, when the sleeve is at the rear position, one or more protrusions are received in one or more corresponding notches, and at this point, the retainer fully leaves the matching concave part of the mating external conductor, thus separating the coaxial connector and the mating connector. The push-pull coaxial connector uses a simple concave-convex structure, which locks the front and rear positions of the push-pull structure of the coaxial connector and it has a simple structure and is low-cost.

20 Claims, 5 Drawing Sheets

(56) References Cited

U.S. PATENT DOCUMENTS

| | | | | |
|---|---|---|---|---|
| 7,637,774 | B1 | 12/2009 | Vaccaro | |
| 10,096,937 | B2 | 10/2018 | Shao et al. | |
| 11,721,937 | B2 * | 8/2023 | Liu | H01R 13/6276 439/578 |
| 2003/0082942 | A1 | 5/2003 | Wlos | |
| 2003/0156900 | A1 * | 8/2003 | Vaitkus | F16D 1/112 403/349 |
| 2004/0121641 | A1 | 6/2004 | Fawcett | |
| 2010/0130060 | A1 | 5/2010 | Islam | |
| 2011/0269331 | A1 | 11/2011 | Saber | |
| 2014/0154906 | A1 | 6/2014 | Lee et al. | |
| 2015/0064957 | A1 * | 3/2015 | Zhang | H01R 13/6275 439/362 |
| 2016/0181742 | A1 | 6/2016 | Wilson et al. | |

* cited by examiner

PUSH-PULL COAXIAL CONNECTOR HAVING A MOVABLE SLEEVE

RELATED APPLICATION

The present application is a continuation of and claims priority to U.S. patent application Ser. No. 17/466,021, filed Sep. 3, 2021, now U.S. Pat. No. 11,721,937, which claims priority from and the benefit of Chinese Utility Model Application No. 202022099357.3, filed Sep. 23, 2020, the disclosure of each of which is hereby incorporated herein by reference in full.

FIELD OF THE INVENTION

The present disclosure relates generally to the connector field. More specifically, the present disclosure relates to a push-pull coaxial connector.

BACKGROUND OF THE INVENTION

Coaxial cables are usually used in radiofrequency (RF) communication systems. Typical coaxial cables comprise a central conductor, external conductor, and a dielectric spacer separating the central conductor and external conductor. Coaxial connectors can be used to connect a coaxial cable in a RF communication system which requires high precision and reliability. Coaxial connectors comprise a pin structure of the central conductor connected to the coaxial cable, and a housing structure of the external conductor connected to the coaxial cable.

Nuts are often used for electrical and mechanical connection between two matching coaxial connectors. However, nut connections require the nut to be rotated many times and it is relatively cumbersome to operate. Push-pull mated coaxial connectors use a push-pull structure that moves back and forth to complete electrical and mechanical interconnection between the two without requiring the above-mentioned nuts that need to be rotated many times.

When the push-pull coaxial connector is used in outdoor scenarios, waterproof covers need to be put over the two mating coaxial connectors. However, the position of the waterproof covers needs to be adjusted before and after installing the waterproof covers. Adjustment of waterproof covers before and after installation can cause the originally secured push-pull structure to be displaced, thus loosening the two mating coaxial connectors.

SUMMARY OF THE INVENTION

The present disclosure provides a coaxial connector which can overcome at least one of the above-mentioned defects in the prior products.

An aspect of the present disclosure relates to a push-pull coaxial connector, wherein the coaxial connector comprises: an external conductor, where the external conductor is configured to internally receive the matching external conductor of a mating connector, with concave parts or through holes on the inner surface of the side wall of the external conductor that house retainers and corresponding matching concave parts on the outer surface of the side wall of the mating external conductor, of which, there are one or more protrusions on the outer surface of the side wall of the external conductor; and a sleeve surrounding the external conductor, where the sleeve is able to slide between the front position and rear position along the external conductor and is able to rotate around the circumference of the external conductor, of which, there are one or more corresponding notches to receive one or more protrusions on the rear surface of the sleeve. When the sleeve is at the front position, one or more protrusions are staggered away from one or more notches and abutted on the rear surface of the sleeve to prevent the sleeve from moving backward, and at this point, part of the retainer is in the concave part or through hole of the external conductor and part of it is in the mating concave part of the mating external conductor, thus maintaining the connection between the coaxial connector and mating connector. When the sleeve is at the rear position, one or more protrusions are received in one or more corresponding notches, and at this point, the retainer fully leaves the matching concave part of the mating external conductor, thus separating the coaxial connector and the mating connector.

In some embodiments, the coaxial connector further comprises a central conductor and dielectric spacer, and the dielectric spacer secures the central conductor at the radial central position of the external conductor.

In some embodiments, one or more protrusions correspond to one or more notches in terms of quantity, shape and/or the circumferential position around the coaxial connector.

In some embodiments, one or more protrusions and one or more notches are circumferentially and evenly spaced apart, or circumferentially and unevenly spaced apart.

In some embodiments, one or more protrusions comprise pins and/or bolts.

In some embodiments, the external conductor comprises a front section, middle section and rear section, and the front section protrudes from the middle section, forming an inner shoulder and outer shoulder with the middle section.

In some embodiments, the retainer comprises a lock ball and the lock ball is positioned in the through hole of the front section.

In some embodiments, the annular slider is installed in the inner surface of the front section, and is spaced apart from the inner shoulder.

In some embodiments, the inner spring is in the inner surface of the front section, and its two ends are respectively abutted on the inner shoulder and annular slider, thus exerting biasing force on the annular slider to move forwards.

In some embodiments, the annular slider has a supporting groove on its radial outer surface that supports the lock ball.

In some embodiments, the front end of the annular slider has an inclined front surface, and the front of the mating concave part of the mating external conductor of the mating connector has an inclined stepped surface to abut against the inclined front surface.

In some embodiments, the sleeve has a convex part on the inner surface between its front and rear ends that radially protrudes inwards, with the front side of the inner surface of the convex part having an inclined bearing surface that is partially abutted to the lock ball and the inner surface of the sleeve having a groove to receive the lock ball at the front of the adjacent convex part, and the inclined bearing surface and groove work together to control the protrusion and retraction of the lock ball in the through hole.

In some embodiments, the back end of the convex part of the sleeve is the shoulder, the outer spring goes around the outer surface of the front section, and its two ends are respectively abutted to the outer shoulder of the external conductor and the shoulder of the sleeve, thus exerting biasing force on the push-pull sleeve to move forwards.

In some embodiments, the lock ball is received in the space formed by the groove, the through hole of the external conductor and the annular slider when the sleeve is at the rear position.

In some embodiments, the lock ball is received in the space formed by the convex part of the sleeve, the through hole of the external conductor and the mating concave part of the mating external conductor when the sleeve is at the front position.

In some embodiments, one or more protrusions are installed on the front section, middle section or rear section of the external conductor.

In some embodiments, the rear section is configured to house and secure the dielectric spacer, and the middle section is configured to house and secure the contact reinforcement, which is used to reinforce the electrical contact between the external conductor and the mating external conductor.

In some embodiments, the external conductor comprises a front section, middle section and rear section, where the front section has a concave part that is recessed inward from its inner surface, the retainer comprises an elastic snap ring and the concave part is configured to receive the snap ring.

In some embodiments, the front end of the sleeve has a L-shaped hook-shaped part.

In some embodiments, the hook-shaped part comprises a vertical section and horizontal section, where the vertical section radially extends inwards from the front end of the sleeve and the horizontal section extends horizontally backward from the radial inner end of the vertical section to below the concave part.

In some embodiments, the snap ring is received in the space formed by the hook-shaped part of the sleeve and the concave part of the external conductor when the sleeve is at the rear position.

In some embodiments, the snap ring is received in the space formed by the concave part of the external conductor and the mating concave part of the mating external conductor when the sleeve is at the front position.

In some embodiments, one or more protrusions are installed on the front section, middle section or rear section of the external conductor.

In some embodiments, the middle section and rear section are configured to house the dielectric spacer, and the contact reinforcement is installed in the gap between the middle section, rear section and dielectric spacer to reinforce the electrical contact between the external conductor and the mating external conductor.

Other features and advantages of the subject technology of the present disclosure will be set forth in the description below, and in part will be apparent from the description, or may be learned by practice of the subject technology of the present disclosure. The advantages of the subject technology of the present disclosure will be realized and attained by the structure particularly pointed out in the written specification and claims hereof as well as the appended drawings.

It should be understood that both the foregoing general description and the following detailed description are exemplary and explanatory and are intended to provide further explanation of the subject technology of the present disclosure as claimed.

BRIEF DESCRIPTION OF THE DRAWINGS

A plurality of aspects of the present disclosure will be better understood after the following specific embodiments are read with reference to the appended drawings. In the appended drawings.

DESCRIPTION OF EMBODIMENTS

Figure 1A:
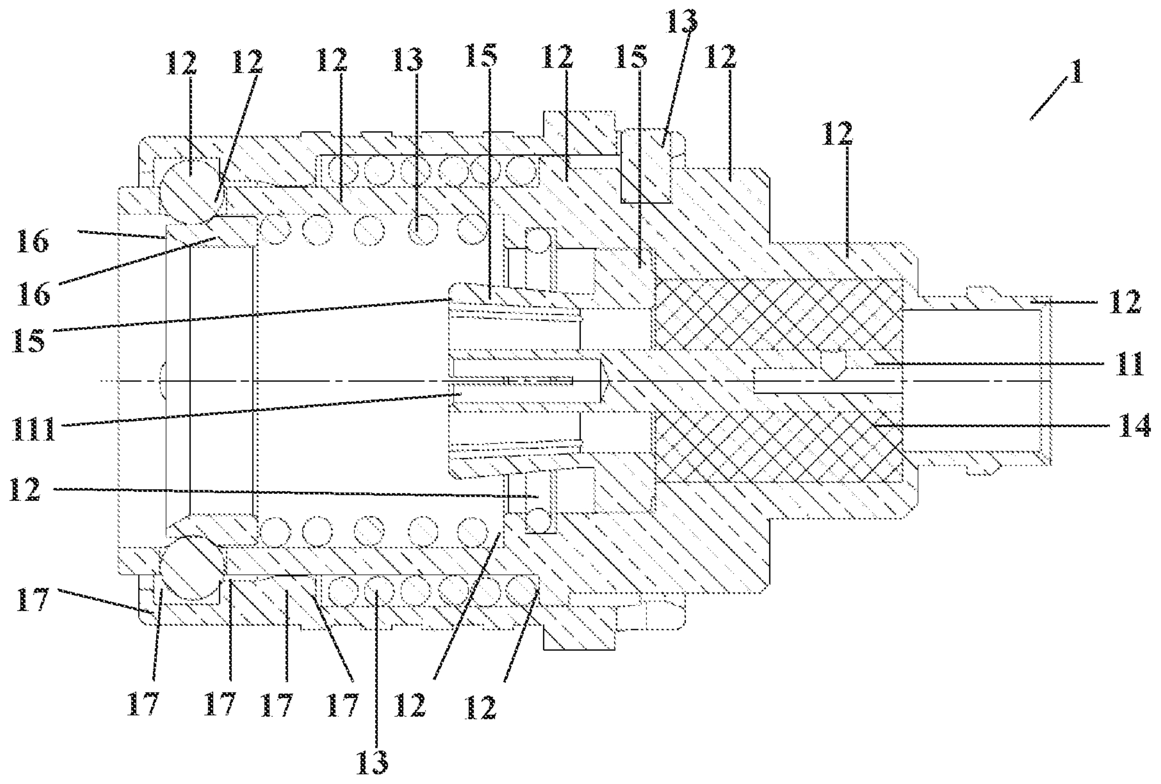
FIGS. 1A and 1B are sectional and perspective views of a coaxial connector according to the first embodiment of the present disclosure.

The present disclosure will be described below with reference to the appended drawings, and the appended drawings illustrate several embodiments of the present disclosure. However, it should be understood that the present disclosure may be presented in many different ways and is not limited to the embodiments described below; in fact, the embodiments described below are intended to make the disclosure of the present disclosure more complete and to fully explain the protection scope of the present disclosure to those skilled in the art. It should also be understood that the embodiments disclosed in the present disclosure may be combined in various ways so as to provide more additional embodiments.

It should be understood that in all the appended drawings, the same reference numerals and signs denote the same elements. In the appended drawings, the dimensions of certain features can be distorted for clarity.

It should be understood that the words in the specification are only used to describe specific embodiments and are not intended to limit the present disclosure. Unless otherwise defined, all terms (including technical terms and scientific terms) used in the specification have the meanings commonly understood by those skilled in the art. For brevity and/or clarity, well-known functions or structures may not be described in detail.

The singular forms “a”, “an”, “the” and “this” used in the specification all include plural forms unless clearly indicated. The words “comprise”, “contain” and “have” used in the specification indicate the presence of the claimed features, but do not exclude the presence of one or more other features. The word “and/or” used in the specification includes any or all combinations of one or more of the related listed items. The words “between X and Y” and “between approximate X and Y” used in the specification shall be interpreted as including X and Y. The words “between approximate X and Y” and “from approximate X to Y” used in the specification means “between approximate X and approximate Y” and “from approximate X to approximate Y”, respectively.

In the specification, when it is described that an element is “on” another element, “attached” to another element, “connected” to another element, “coupled” to another element, or “in contact with” another element, etc., the element may be directly on another element, attached to another element, connected to another element, coupled to another element, or in contact with another element, or an intermediate element may be present. In contrast, if an element is described “directly” “on” another element, “directly attached" to another element, "directly connected" to another element, "directly coupled" to another element or "directly contacting" another element, there will be no intermediate elements. In the specification, a feature that is arranged "adjacent" to another feature, may denote that a feature has a part that overlaps an adjacent feature or a part located above or below the adjacent feature.

In the specification, words expressing spatial relations such as "upper", "lower", "left", "right", "front", "rear", "top", and "bottom" may describe the relation between one feature and another feature in the appended drawings. It should be understood that, in addition to the orientations shown in the appended drawings, the words expressing spatial relations further include different orientations of a device in use or operation. For example, when a device in the appended drawings rotates reversely, the features originally described as being "below" other features now can be described as being "above" the other features. The device may also be oriented in other directions (rotated by 90 degrees or in other orientations), and in this case, a relative spatial relation will be explained accordingly.

Figure 1B:
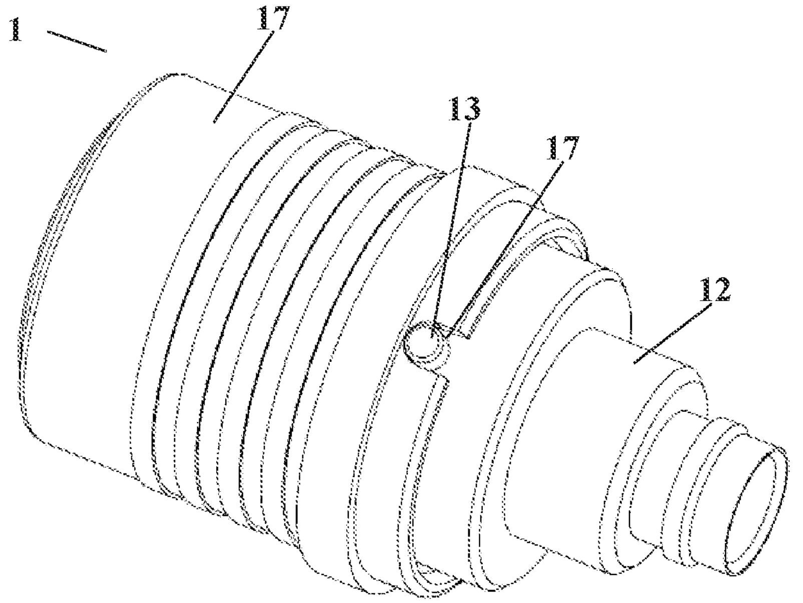
Figure 2:
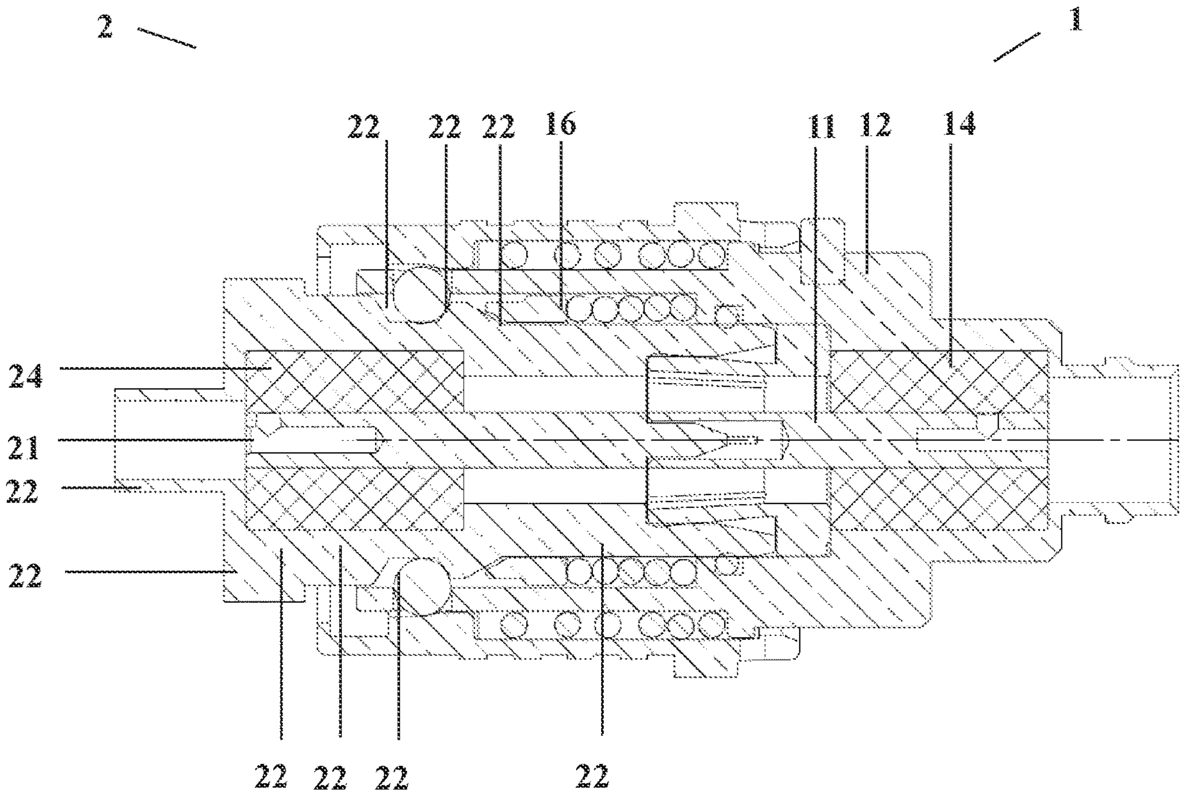
FIG. 2 is the sectional view of a coaxial connector connected to the mating coaxial connector in FIGS. 1A and 1B.

FIGS. 1A and 1B are sectional and perspective views of a male connector 1 according to a first embodiment of the present disclosure, and FIG. 2 is a sectional view of the male connector 1 connected to a mating female connector 2. The female connector 2 comprises a central conductor 21, external conductor 22, and a dielectric spacer 24 between the central conductor 21 and external conductor 22. The central conductor 21 is largely columnar and its rear end is electrically and mechanically connected to the central conductor of a first cable (not shown). The dielectric spacer 24 is used to insulate and space apart the central conductor 21 and external conductor 22, and secure the central conductor 21 at a radially central position of the external conductor 22. The external conductor 22 is largely cylindrical, and its rear end is electrically and mechanically connected to the external conductor of the first cable (not shown).

The body 221 of the external conductor 22 comprises a front section 222, middle section 223 and rear section 224. The outer diameter of the front section 222, middle section 223 and rear section 224 increases progressively, so the body 221 forms a stepped outer surface. A groove 225 is recessed inward from the outer surface of the middle section 223 and is defined by having an inclined front side wall 226 and inclined rear side wall 227. A shoulder between the outer surface of the front section 222 and the outer surface of the middle section 224 has an inclined stepped surface 228, and it is in front of the groove 225.

The male connector 1 comprises a central conductor 11, an external conductor 12, and a dielectric spacer 14 between the central conductor 11 and external conductor 12. The central conductor 11 is largely columnar and its rear end is electrically and mechanically connected to the central conductor of a second cable (not shown). In addition, its front surface has a concave part 111 that receives the front end of the central conductor 21 of the female connector 2. The dielectric spacer 14 is used to insulate and space apart the central conductor 11 from the external conductor 12. The external conductor 12 is largely cylindrical, and its rear end is electrically and mechanically connected to the external conductor of the second cable (not shown).

The body 121 of the external conductor 12 comprises a front section 122, middle section 123 and rear section 124. The rear section 124 is used to house and secure the dielectric spacer 14. The middle section 123 is used to house and secure a spring basket 15, which is used to establish electrical contact between external conductors 12 and 22. The spring basket 15 has an annular base 151 and an elastic finger-shaped part 152 that protrudes from the radial internal part of the annular base 151. The annular base 151 is secured at and abuts on the shoulder between the inner surface of the middle section 123 and the inner surface of the rear section 124, and a gap 125 is formed between the inner surface and finger-shaped part 152 of the middle section 123, which is used to receive the front end of the front section 222 of the external conductor 22 of the female connector 2. The front section 122 protrudes from the middle section 123 and both its inner diameter and outer diameter are smaller than the middle section 123, thus forming an inner shoulder 126 and outer shoulder 127 between the front section 122 and the middle section 123.

One or more lock balls 128 (for example four—FIG. 1A shows two) are positioned in the through hole 129 of the front section 122 to maintain the splicing between the male connector 1 and the female connector 2. The annular slider 16 is installed in the inner surface of the front section 122, and it is spaced apart from the inner shoulder 126. The inner spring 130 is in the inner surface of the front section 122, and its two ends are respectively abutted on the inner shoulder 126 and annular slider 16, thus exerting a biasing force on the annular slider 16 to move forward. The annular slider 16 has a supporting groove on its radial outer surface that supports the lock ball 128, and its front end has an inclined front surface 161 to abut against the inclined stepped surface 228 of the external conductor 22 of the female connector 2.

The male connector 1 further comprises a push-pull sleeve 17. The push-pull sleeve 17 is largely cylindrical, and it is able to slide back and forth on the outer surface of the front section 122 and middle section 123 around the front section 122 and middle section 123 of the external conductor 12. The push-pull sleeve 17 has a convex part 171 on the inner surface between its front and rear ends that radially protrudes inwards, and the front side of the inner surface of the convex part 171 has an inclined bearing surface 172. There is a groove 173 in front of the adjacent convex part 171 on the inner surface of the push-pull sleeve 17. The groove 173 and the inclined bearing surface 172 are adjacent to each other and the groove 173 can be used to receive the lock ball 128, while the inclined bearing surface 172 can be used to abut the lock ball 128, so the inclined bearing surface 172 and groove 173 can work together to control the protrusion and retraction of the lock ball 128 in the through hole 129. The rear end of the convex part 171 is the shoulder 174. The outer spring 131 encircles the outer surface of the front section 122, and its two ends are respectively abutted to the outer shoulder 127 of the external conductor 12 and the shoulder 174 of the push-pull sleeve 17, thus exerting a biasing force on the push-pull sleeve 17 to move forwards.

Figure 3A:
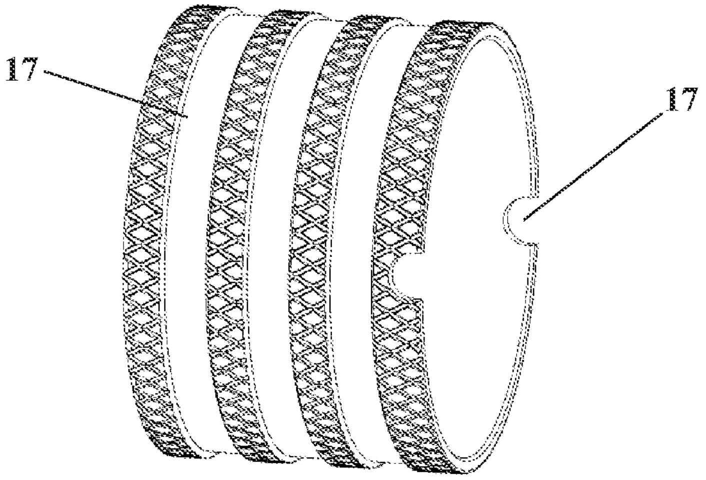
FIGS. 3A and 3B are perspective views of the notch and protrusion of the coaxial connector in FIGS. 1A and 1B.
Figure 3B:
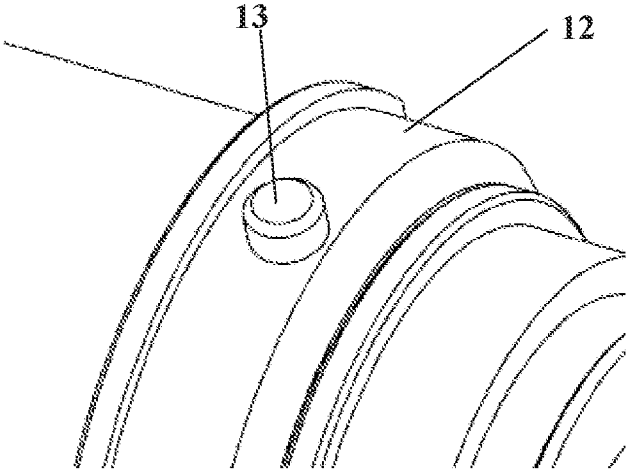

As shown in FIGS. 1B, 3A and 3B, there are one or more notches 175 along the circumference of the rear surface of the push-pull sleeve 17. There are one or more matching protrusions 134 (FIG. 1B shows a protrusion on the middle section 123, but it may also be on the front section 122 or rear section 124, depending on the relative length of the push-pull sleeve 17 and the external conductor 122) on the outer surface of the external conductor 12. The protrusion 134 corresponds to the notch 175 in terms of quantity, shape and the circumferential position of the central axis around the male connector 1. For example, one, two, three, four, or more notches 175 and protrusions 134 may be installed, respectively. The shape of the notch 175 matches the shape of the protrusion 134. For example, if the shape of the notch 175 is a semi-circle, the shape of the protrusion 134 is a circle with a smaller diameter; or if the shape of the notch 175 is a square, the shape of the protrusion 134 is a square with smaller dimensions. The notch 175 and protrusion 134 may be circumferentially and evenly spaced apart or unevenly spaced apart. The protrusion 134 may be a pin or bolt, etc.

When the male connector 1 is separated from the female connector 2, as shown in FIGS. 1A and 1B, the push-pull sleeve 17 of the male connector 1 is positioned at its rear and the protrusion 134 of the external conductor 12 is fully or partially received in the notch 175 of the push-pull sleeve 17. The outer spring 131 provides the biasing force for the push-pull sleeve 17 to move forward, and the groove 173 of the push-pull sleeve 17 is directly above the through hole 129 of the external conductor 12. The inner spring 130 provides the biasing force for the annular slider 16 to move forward, and the annular slider 16 is directly below the through hole 129 of the external conductor 12, and the lock ball 128 is received in the supporting groove of the annular slider 16. Thus, the lock ball 128 is received in the space formed by the groove 173 of the push-pull sleeve 17, the through hole 129 of the external conductor 12 and the annular slider 16.

Figure 4A:
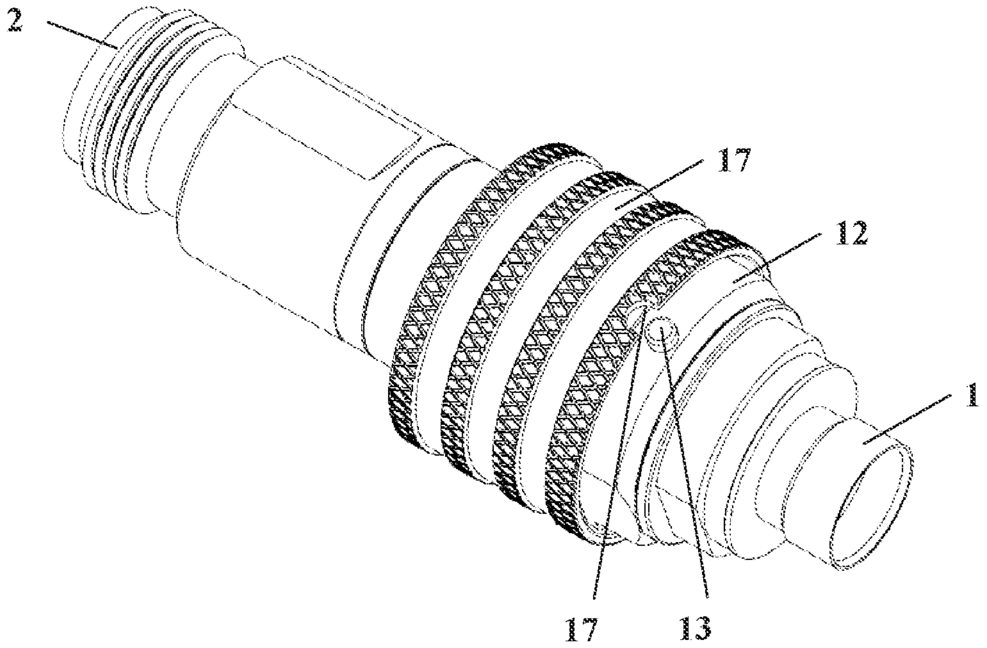
FIGS. 4A and 4B are perspective views of the coaxial connector connected to the mating coaxial connector in FIGS. 1A and 1B.
Figure 4B:
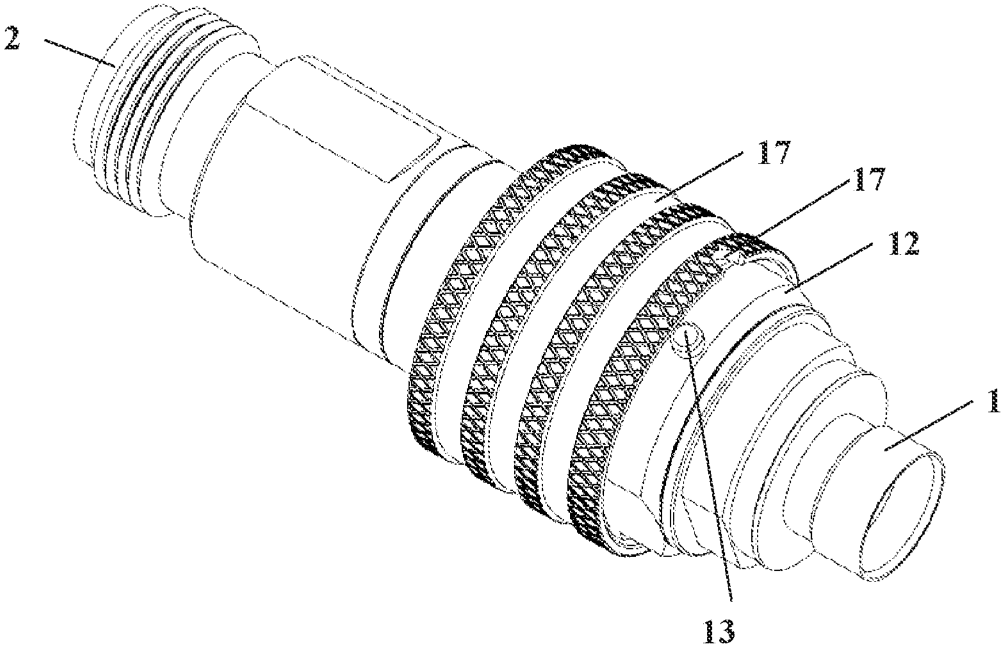

During mating of the male connector 1 to the female connector 2, as shown in FIG. 2, the female connector 2 slides towards the male connector 1 and the inclined stepped surface 228 of the external conductor 22 of the female connector 2 is abutted to the inclined front surface 161 of the annular slider 16, forcing the annular slider 16 to resist the biasing force of the inner spring 130 to move away from the lock ball 128 towards the inner shoulder 126 until the front section 222 of the external conductor 22 of the female connector 2 is received in the gap 125 between the elastic finger-shaped part 152 of the male connector 1 and the middle section 123. When the annular slider 16 moves away from the lock ball 128, the lock ball 128 moves inward freely in a radial manner. The continuous movement of the female connector 2 towards the male connector 1 causes the lock ball 128 to slide downwards along the front inclined surface 226 of the groove 225 of the female connector 2 and enter the groove 225 of the female connector 2. Once the lock ball 128 is positioned in the groove 225, the lock ball 128 will no longer obstruct the convex part 171 of the push-pull sleeve 17. The push-pull sleeve 17, relative to the external conductor 12, slides to the front position towards the female connector 2 from the rear position. At the same time, the protrusion 134 of the external conductor 12 moves away from the notch 175 of the push-pull sleeve 17 and the inclined bearing surface 172 abuts the lock ball 128 below. At this time, the male connector 1 and female connector 2 are fully mated. Thereafter, as shown in FIGS. 4A and 4B, the push-pull sleeve 17 rotates circumferentially relative to the external conductor 12 and abuts the protrusion 134 of the external conductor 12 to the rear surface between adjacent notches 175 of the push-pull sleeve 17, so as to prevent the push-pull sleeve 17 from moving backward relative to the external conductor 12, away from the front position. It can be seen from this that the depth of the notch 175 is largely equivalent to or slightly larger than the distance that the push-pull sleeve 17 slides from the rear position to the front position relative to the external conductor 12.

Figure 5A:
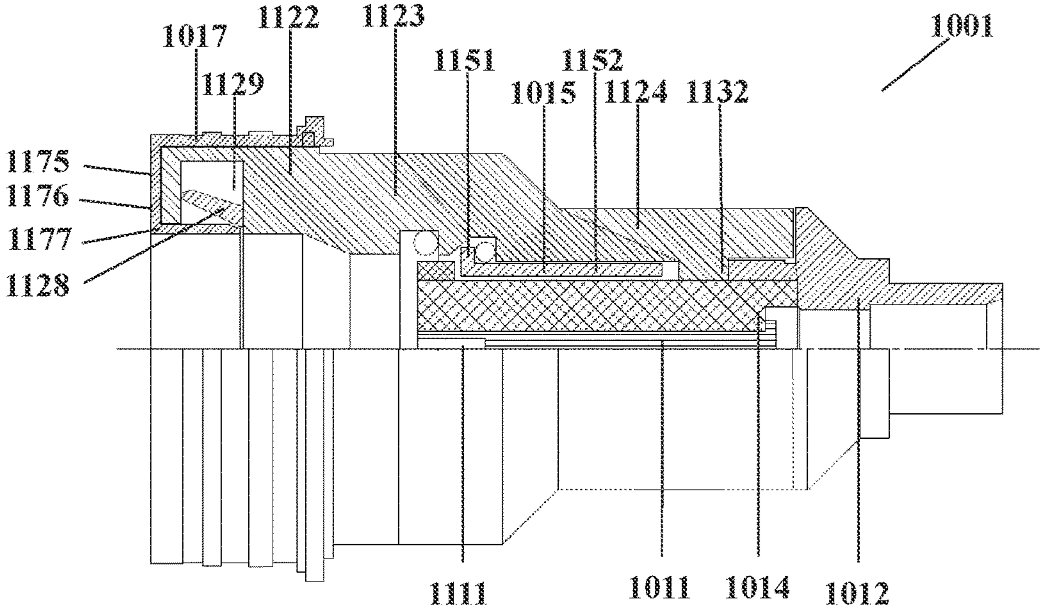
FIG. 5A is a sectional view of a coaxial connector according to the second embodiment of the present disclosure.
Figure 5B:
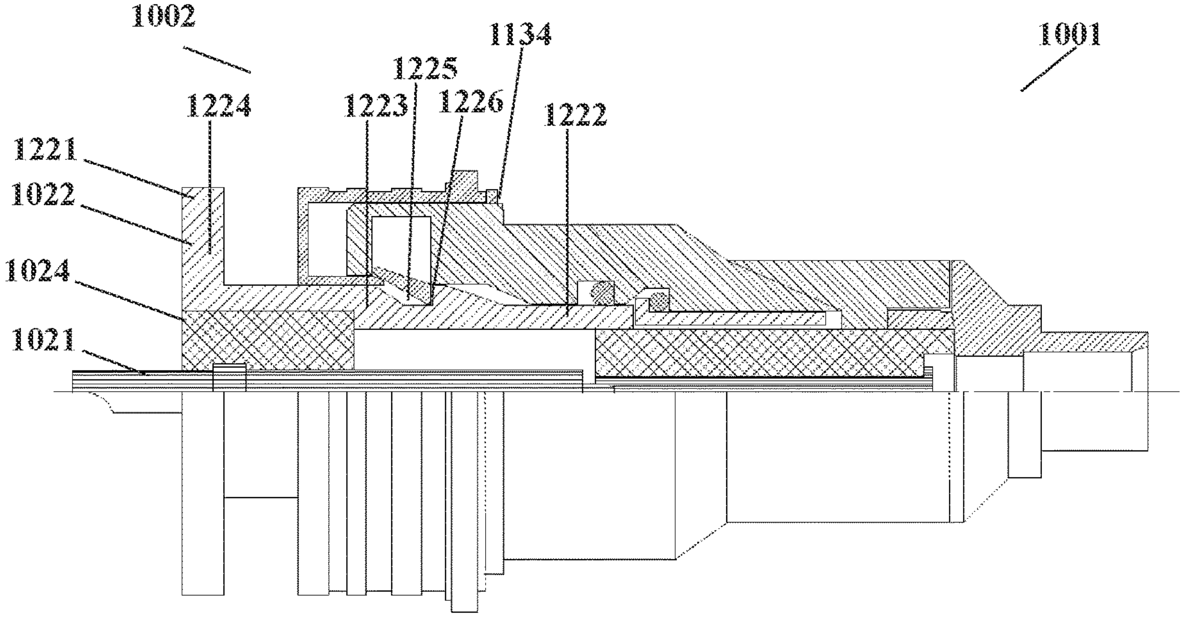
FIG. 5B is a sectional view of the coaxial connector connected to a mating coaxial connector in FIG. 5A.

The male connector 1001 according to a second embodiment of the present disclosure will be described below with reference to FIGS. 5A and 5B, of which FIG. 5A is a sectional view of the male connector 1001 according to the second embodiment of the present disclosure, and FIG. 5B is a sectional view of the male connector 1001 connected to the mating female connector 1002. The same or similar structures of the male connector 1001 shall be expressed with the same reference numerals and signs plus 1000 in the appended drawings of the male connector 1.

As shown in the figures, this male connector 1001 is connected to the mating female connector 1002. The female connector 1002 comprises a central conductor 1021, external conductor 1022, and a dielectric spacer 1024 between the central conductor 1021 and external conductor 1022. The central conductor 1021 is largely columnar and its rear end is electrically connected and mechanically connected to the central conductor of the first cable (not shown). The dielectric spacer 1024 is used to insulate and space apart the central conductor 1021 and external conductor 1022, and secure the central conductor 1021 at a radial central position of the external conductor 1022. The external conductor 1022 is largely cylindrical, and its rear end is electrically connected and mechanically connected to the external conductor of the first cable (not shown).

The body 1221 of the external conductor 1022 comprises a front section 1222, middle section 1223 and rear section 1224. The outer diameter of the front section 1222, middle section 1223 and rear section 1224 increases progressively, so the body 1221 forms a stepped outer surface. The groove 1225 is recessed inward from the outer surface of the middle section 1223 and has a vertical front side wall 1226.

The male connector 1001 comprises a central conductor 1011, external conductor 1012, and a dielectric spacer 1014 between the central conductor 1011 and external conductor 1012. The central conductor 1011 is largely columnar and its rear end is electrically connected and mechanically connected to the central conductor of the second cable (not shown). In addition, its front surface has a concave part 1111 that is used to receive the front end of the central conductor 1021 of the female connector 1002. The dielectric spacer 1014 is used to insulate and space apart the central conductor 1011 from the external conductor 1012. The external conductor 1012 is largely cylindrical, and its rear end is electrically connected and mechanically connected to the external conductor of the second cable (not shown).

The body 1121 of the external conductor 1012 comprises a front section 1122, middle section 1123 and rear section 1124. The outer diameter of the front section 1122, middle section 1123 and rear section 1124 increases progressively, so the body 1221 forms a stepped outer surface. The middle section 1123 and rear section 1124 are used to house the dielectric spacer 1014. The rear section 1124 has a convex part 1132 on the inner surface that radially protrudes inwards to secure the dielectric spacer 1014. The contact reinforcement 1015 is installed in the gap 1133 between the middle section 1123, rear section 1124 and dielectric spacer 1014 to reinforce the electrical contact between external conductors 1012 and 1022. The contact reinforcement 1015 has an annular base 1151 and an elastic finger-shaped part 1152 that protrudes from the radial internal part of the annular base 1151. The annular base 1151 is secured using an O-ring and is abutted on the shoulder between the inner surface of the middle section 1123 and the inner surface of the rear section 1124, and the finger-shaped part 1152 protrudes into the gap between the rear section 1124 and dielectric spacer 1014. The front section 1122 has a groove 1129 that is recessed inward from its inner surface. The snap ring 1128 is positioned in the groove 1129, and it is used to maintain the splicing between the male connector 1001 and the female connector 1002.

The male connector 1001 further comprises a push-pull sleeve 1017. The push-pull sleeve 1017 is largely cylindrical, and it is able to slide back and forth on the outer surface of the front section 1122 around the front section 1122 of the external conductor 1012. There is a hook-shaped part 1175 at the front end of the push-pull sleeve 1017. This hook-shaped part 1175 is largely L-shaped, and it comprises a vertical section 1176 and a horizontal section 1177. The vertical section 1176 radially extends inwards from the front end of the push-pull sleeve 1017 and the horizontal section 1177 extends horizontally backwards from the radial inner end of the vertical section 1176 to below the groove 1129 of the external conductor 1012 through the gap between external conductors 1012 and 1022, abutting on the radial inner surface of the snap ring 1128.

There are one or more notches along the circumference of the rear surface of the push-pull sleeve 1017 (not shown). There are one or more matching protrusions 1134 (the FIG. 5A shows it on the front section 1122, but it may also be on the middle section 1123 or rear section 1124, depending on the relative length of the push-pull sleeve 1017 and the external conductor 1122) on the outer surface of the external conductor 1012. The protrusion 1134 corresponds to the notch in terms of quantity, shape and the circumferential position of the central axis around the male connector 1001. For example, one, two, three, four, or more notches and protrusions 1134 may be installed, respectively. The shape of the notch matches the shape of the protrusion 1134. For example, if the shape of the notch is a semi-circle, the shape of the protrusion 1134 is a circle with a smaller diameter; or if the shape of the notch is a square, the shape of the protrusion 1134 is a square with smaller dimensions. The notch and protrusion 1134 may be circumferentially and evenly spaced apart or unevenly spaced apart. The protrusion 1134 may be a pin or bolt, etc.

When the male connector 1001 is separated from the female connector 1002, the push-pull sleeve 1017 of the male connector 1001 is positioned at its rear and the protrusion 1134 of the external conductor 1012 is fully or partially received in the notch of the push-pull sleeve 1017. The horizontal section 1177 of the hook-shaped part 1175 of the push-pull sleeve 1017 largely closes or mostly closes the groove 1129 of the external conductor 1012. The snap ring 1128 is received in the groove 1129 of the push-pull sleeve 1017, and is abutted on the horizontal section 1177 of the hook-shaped part 1175 due to its elasticity.

During mating of the male connector 1001 to the female connector 1002, the female connector 1002 slides towards the male connector 1001 and the front section 1222 of the external conductor 1022 of the female connector 1002 is received in the gap between the middle section 1123 and rear section 1124 of the external conductor 1012 of the male connector 1 and the dielectric spacer 1014, and is eventually abutted on the annular base 1151 of the contact reinforcement 1015. At this point, the groove 1129 of the external conductor 1012 is directly above the groove 1225 of the external conductor 1022. The push-pull sleeve 1017, relative to the external conductor 1012, slides to the front position towards the female connector 1002 from the rear position, the groove 1129 of the external conductor 1022 opens towards the groove 1225, and only the front part is covered by the horizontal section 1177 of the hook-shaped part 1175. The front end of the snap ring 1128 is abutted on the horizontal section 1177 of the hook-shaped part 1175 and is abutted to the front side wall of the groove 1129 of the external conductor 1012, while the rear end radially inwardly retracts due to its own elasticity and is abutted on the bottom wall of the groove 1225 and is abutted to the vertical front side wall 1226 of the groove 1225 and the rear side wall of the groove 1129. At this time, the male connector 1001 and female connector 1002 are fully spliced. Thereafter, the push-pull sleeve 1017 rotates circumferentially relative to the external conductor 1012 and abuts the protrusion 1134 of the external conductor 1012 to the rear surface between adjacent notches of the push-pull sleeve 1017, so as to prevent the push-pull sleeve 1017 from moving backwards relative to the external conductor 1012, away from the front position. It can be seen from this that the depth of the notch is largely equivalent to or slightly larger than the distance that the push-pull sleeve 1017 slides from the rear position to the front position relative to the external conductor 1012.

The concave-convex locking structure (i.e., comprising notches and protrusions) based on the pull-push coaxial connector according to the embodiment of the present disclosure can be applied to the push-pull structure of the above-mentioned coaxial connectors 1 and 1001 and can also be applied to the push-pull structure of any other coaxial connectors.

The push-pull coaxial connector according to the embodiment of the present disclosure uses a simple concave-convex structure, which locks the front and rear positions of the push-pull structure of the coaxial connector and it has a simple structure and is low-cost.

The push-pull coaxial connector according to the embodiment of the present disclosure uses simple rotation operations to switch the front and rear positions of the push-pull structure, and the operations are simple.

Although the exemplary embodiments of the present disclosure have been described, it should be understood by those skilled in the art that a plurality of variations and changes can be created and made to the exemplary embodiments of the present disclosure without essentially departing from the spirit and scope of the present disclosure. Therefore, all variations and changes are included in the protection scope of the present disclosure defined by the claims. The present disclosure is defined by the attached claims, and equivalents of these claims are also included.

The invention claimed is:

1. A push-pull coaxial connector, wherein the coaxial connector comprises:

an external conductor, where the external conductor is configured to internally receive the matching external conductor of a mating connector, with concave parts or through holes on the inner surface of the side wall of the external conductor that house retainers and corresponding matching concave parts on an outer surface of the side wall of the mating external conductor, of which, there are one or more protrusions on the outer surface of the side wall of the external conductor;

a sleeve surrounding the external conductor, where the sleeve is able to slide between the front position and rear position along the external conductor and is able to rotate around the circumference of the external conductor, of which, there are one or more corresponding notches to receive one or more protrusions on the rear surface of the sleeve;

wherein, when the sleeve is at the front position, one or more protrusions are staggered away from one or more notches and abutted on the rear surface of the sleeve to prevent the sleeve from moving backward, and at this point, part of the retainer is in the concave part or through hole of the external conductor and part of it is in the mating concave part of the mating external conductor, thus maintaining the connection between the coaxial connector and mating connector;

wherein, when the sleeve is at the rear position, one or more protrusions are received in one or more corresponding notches, and at this point, the retainer fully leaves the matching concave part of the mating external conductor, thus separating the coaxial connector and the mating connector.

2. The push-pull coaxial connector as claimed in claim 1, wherein the coaxial connector further comprises a central conductor and dielectric spacer, and the dielectric spacer secures the central conductor at the radial central position of the external conductor.

3. The push-pull coaxial connector as claimed in claim 2, wherein one or more protrusions correspond to one or more notches in terms of quantity, shape and/or the circumferential position around the coaxial connector.

4. The push-pull coaxial connector as claimed in claim 3, wherein the external conductor comprises a front section, middle section and rear section, and the front section protrudes from the middle section, forming an inner shoulder and outer shoulder with the middle section.

5. The push-pull coaxial connector as claimed in claim 4, wherein the retainer comprises a lock ball and the lock ball is positioned in the through hole of the front section.

6. The push-pull coaxial connector as claimed in claim 5, wherein an annular slider is installed in the inner surface of the front section, and is spaced apart from the inner shoulder.

7. The push-pull coaxial connector as claimed in claim 6, wherein the inner spring is in an inner surface of the front section, and its two ends are respectively abutted on the inner shoulder and annular slider, thus exerting biasing force on the annular slider to move forwards.

8. The push-pull coaxial connector as claimed in claim 6, wherein the annular slider has a supporting groove on its radial outer surface that supports the lock ball.

9. The push-pull coaxial connector as claimed in claim 6, wherein the front end of the annular slider has an inclined front surface, and the front of the mating concave part of the mating external conductor of the mating connector has an inclined stepped surface to abut against the inclined front surface.

10. The push-pull coaxial connector as claimed in claim 6, wherein the sleeve has a convex part on the inner surface between its front and rear ends that radially protrudes inwards, with the front side of the inner surface of the convex part having an inclined bearing surface that is partially abutted to the lock ball and the inner surface of the sleeve having a groove to receive the lock ball at the front of the adjacent convex part, and the inclined bearing surface and groove work together to control the protrusion and retraction of the lock ball in the through hole.

11. The push-pull coaxial connector as claimed in claim 10, wherein the back end of the convex part of the sleeve is the shoulder, the outer spring goes around the outer surface of the front section, and its two ends are respectively abutted to the outer shoulder of the external conductor and the shoulder of the sleeve, thus exerting biasing force on the push-pull sleeve to move forward.

12. The push-pull coaxial connector as claimed in claim 10, wherein the lock ball is received in the space formed by the groove, the through hole of the external conductor and the annular slider when the sleeve is at the rear position.

13. The push-pull coaxial connector as claimed in claim 10, wherein the lock ball is received in the space formed by the convex part of the sleeve, the through hole of the external conductor and the mating concave part of the mating external conductor when the sleeve is at the front position.

14. The push-pull coaxial connector as claimed in claim 4, wherein one or more protrusions are installed on the front section, middle section or rear section of the external conductor.

15. The push-pull coaxial connector as claimed in claim 4, wherein the rear section is configured to house and secure the dielectric spacer, and the middle section is configured to house and secure the contact reinforcement, which is used to reinforce the electrical contact between the external conductor and the mating external conductor.

16. The push-pull coaxial connector as claimed in claim 3, wherein the external conductor comprises a front section, middle section and rear section, where the front section has a concave part that is recessed inward from its inner surface, the retainer comprises an elastic snap ring and the concave part is configured to receive the snap ring.

17. The push-pull coaxial connector as claimed in claim 16, wherein the front end of the sleeve has a L-shaped hook-shaped part.

18. The push-pull coaxial connector as claimed in claim 16, wherein one or more protrusions are installed on the front section, middle section or rear section of the external conductor.

19. The push-pull coaxial connector as claimed in claim 2, wherein one or more protrusions and one or more notches are circumferentially and evenly spaced apart, or circumferentially and unevenly spaced apart.

20. The push-pull coaxial connector as claimed in claim 2, wherein one or more protrusions comprise pins and/or bolts.

* * * * *